No. 739,614.

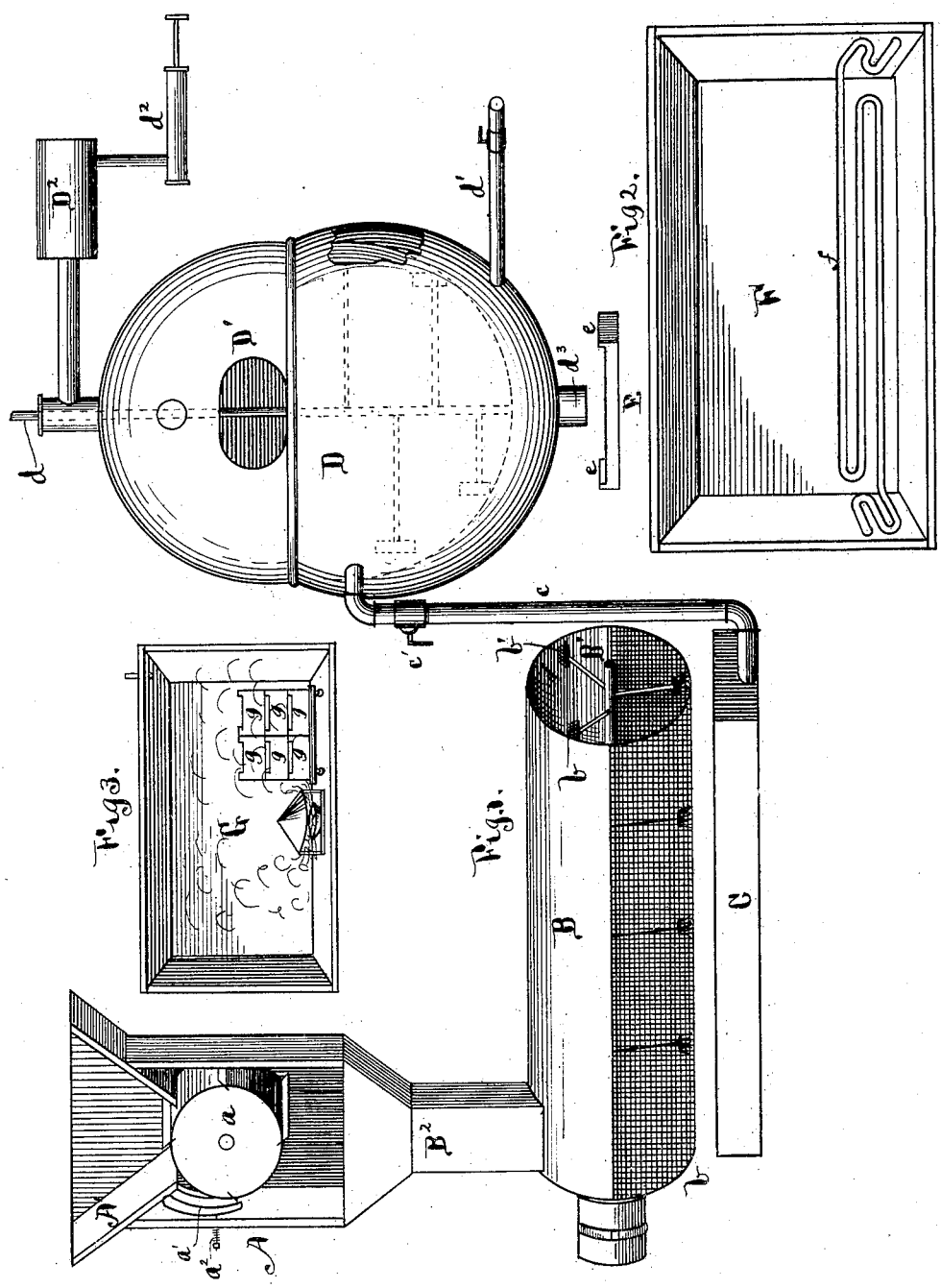

Patented June 27, 1905.

UNITED STATES PATENT OFFICE.

DANIEL F. SHERMAN, OF CHICAGO, ILLINOIS, ASSIGNOR, BY DIRECT AND MESNE ASSIGNMENTS, TO CALIFORNIA CONCENTRATED FRUIT COMPANY, A CORPORATION OF CALIFORNIA.

PROCESS OF PRESERVING FRUIT.

SPECIFICATION forming part of Letters Patent No. 793,614, dated June 27, 1905.

Application filed September 20, 1901. Renewed November 30, 1904. Serial No. 234,875.

*To all whom it may concern:*

Be it known that I, DANIEL F. SHERMAN, a citizen of the United States, residing at Chicago, in the county of Cook and State of Illinois, have invented certain new and useful Improvements in Processes of Preserving Fruit, of which the following is a specification.

The preserving of different fruits in a manner so as to retain in the finished product the natural flavors and conditions of acidity and properties of the fruit has long been sought, but without full satisfactory results. It is well known that dried fruits have the requirement for keeping under certain conditions for a long period of time; but as the drying of fruits is always accompanied with the loss and change of flavor and other natural properties of the fruit the drying of fruit does not, therefore, meet all that is required for a choice article, as in drying the flavor and natural conditions of the fruit are lost or changed more or less and to an extent that dried fruit is not regarded in the same class as fresh fruit. It is also the custom to can fruit for preserving purposes; but in the canning and in the subsequent reduction of canned fruit for use a sacrifice of flavor results, and, furthermore, canned fruit requires time and careful attention and watching both in canning and in the reduction for use. The drying of fruit and the canning of fruit for preserving purposes is the general art practiced at the present day; but with either process the resultant product is not up to the full standard of fresh fruit for many uses, and such standard is what is required in order to have preserved fruit stand on an equality with fresh fruit.

The prime object of the process of the present invention is to preserve fruit under conditions and environments by which the resultant product will have and retain therein the natural color, the taste, and the properties to a great extent of fresh fruit for fillings, sauces, jams, and for use generally—that is to say, the product when returned to form for use will show the color of and have the taste and properties of cooked fresh fruit, thereby enabling preserved fruit to be used and have the qualities of fresh fruit and with practically the same results.

The process employs as an essential step thereof treating the fruit in a vacuum at the final stage of the production of the product, the fruit in some cases prior to the treating *in vacuo* having been subjected to a treatment to prevent decolorization, if so desired, the fruit either untreated or treated being first reduced to a mashed condition preferably and containing the juice and pulp of the fruit, and this mass of juice and pulp is that portion of the fruit which is to be cooked and concentrated *in vacuo* for retaining the natural properties of the fruit, and a further step or condition of the process after the cooking and concentrating *in vacuo* has been completed is the subjecting of the concentrated mass to a drying either natural or by artificial means—that is to say, either in the sun or in a drying-room, evaporating-pan, or other appliance by which the treated mass or paste will be dried to a condition where it will maintain its formation without deterioration or ill effects from atmospheric conditions and which will maintain the flavor and other properties of the fruit and will not absorb atmospheric moisture to an extent sufficient to produce injurious effects thereon.

The process will be understood from the following description, which is applicable in the treatment of fruits generally.

The fruit to be treated is first to be thoroughly washed, so as to remove all foreign substances and impurities. The fruit after being washed is subjected to a crushing treatment by which the body of the fruit is reduced to a mash containing the juice and the pulp of the fruit, and the peel and core with fruits such as apples and pears, and with berries the hulls thereof. The mash from the reducing-machine is deposited in a separator, preferably a sieve or screen, by means of which the juice and the pulp of the fruit are separated from the coarse fibers, the skins, and other portions or the hulls and stems, and it is this fine pulp, with the juice therein, that is to be subjected to the special step or treatment of the process by which the nature of the fruit is retained in the finished product. The pulp that is forced through the separator is fine pulp, as the coarser fiber, the skin, and other portions do not pass through the mesh of the sieve or screen, and this fine pulp is deposited from the sieve or screen into a receptacle located beneath the same in proper position for the pulp, with the juice, to descend thereinto. The pulping step or treatment of the process, if so desired, can be dispensed with and the grinding step or treatment be made sufficient to answer the purpose where it is not desired to have the different portions of the fruit separated from the other, but to have the pulp proper and the coarser fiber and the skin all subjected to the special step or treatment of the process.

The essential and most important step of the process is now reached. The crushed or pulped fruit, either after leaving the grinder as a mash or after the "pulp proper," by which is meant the solids and juices of the fruit, has been separated from the other portions, is removed from the receptacle into which it is deposited and transferred to a vacuum pan or kettle. The pan or kettle employed may be of ordinary construction containing an agitator, by means of which the material delivered into the pan or kettle can be thoroughly stirred. The pan or kettle is first brought to a condition of *vacuo* sufficient for the purpose of drawing thereinto the pulp, and when this stage of *vacuo* is reached the controlling cock or valve in the pipe between the vacuum pan or kettle and the receptacle for the pulp is opened, when the pulp material will be drawn into the pan or kettle until it reaches the lower level of the manhole of the pan or kettle. When the pan or kettle is filled to the height stated or such height as may be deemed advisable, the shut-off cock or valve in the connecting-pipe is closed and the steam or heating means is applied to the pan or kettle and the agitator is operated, and the material in the pan or kettle is thus cooked. The temperature under which the evaporating is done should not be allowed to reach 200° Fahrenheit; but the vacuum in the pan or kettle should be kept as high as possible all the time.

The vacuum treatment is carried out as follows: The vacuum-pump is first started and when the gage registers fifteen points, approximately, the pulp is drawn into the vacuum pan or kettle by suction, care being taken not to allow the vacuum to fall below ten points, and if a lower point than ten is registered the pulp is to be drawn or sucked in less rapidly. The agitator of the vacuum pan or kettle is to be started when the vacuum-gage registers eighteen points, and when this stage is reached the steam should be turned on or admitted to the vacuum-pan. The vacuum-gage during the operation of agitating the material under the heat of the steam should not be allowed to fall below eighteen points and should be maintained approximately at twenty points until the mashed pulp and juice in the pan or kettle begins to thicken, and when the required thickening or reduction to a plastic nature for the material is reached the action of the steam need not proceed any longer, as the resultant is then ready to be drawn off from the vacuum pan or kettle. During this treatment of the mashed material within the vacuum pan or kettle the thermometer will gradually rise from a temperature of 140° to 180°, and preferably the temperature during the treatment within the vacuum pan or kettle should be a medium one of approximately 160°, at which point or between the temperatures of 140° to 180° Fahrenheit the mass begins to thicken, and with the further proceeding of cooking and concentrating the vacuum gradually rises to twenty-six and one-fourth and the thermometer falls to about 135° Fahrenheit, and when these two conditions of vacuum and temperature are reached the product is brought to a condition for removal from the pan and is sufficiently solidified, coherent, and compact to enable it to be readily handled and transferred on trays or otherwise to the drier, where the further removal of the moisture is continued until the finished product is in a condition so as to be proof against both organized or yeast ferments and unorganized or chemical ferments, being, in effect, fermentation proof, so that the unorganized or chemical ferments will not act and oxidize the product, as is the case with these ferments with fresh fruit in the event of injury of the cells of or the exposure of fresh fruit to the air. This treatment of the pulp preferably is proceeded with under natural conditions. The paste of concentrated pulp cooked to the thickened condition may be discharged into a receiving-tank for further manipulation, and from this tank the paste of reduced and concentrated pulp is run onto trays or into molds or otherwise deposited, after which in whatever form the paste mass is finally left it is to be moisture-dried, preferably in a drying-room; but an evaporator or other drying means may be used, or the product may be dried naturally in the sun.

The same treatment is followed with fruit containing pits. The fruit to be pitted is thoroughly washed to remove all foreign substances, after which the pits can be removed by hand or otherwise and the pulp portions of the fruit, skins and all, be thrown into suitable boxes, which, if the fruit is to be first treated to prevent decolorization, may be lug-boxes, so that the boxes, with the contents, can be placed in a suitable receiver or room adapted to treat the fruit therein by sulfur or any harmless agent to prevent decolorization, either chemicals in solution or fumes; but where it is not necessary or desirable to treat to prevent decolorization the fruit can be placed in proper receptacles, from which it can be deposited in a suitable grinder by which the fruit will be reduced to a pulp with the juice therein, and the further treatment thereof is as hereinbefore described for treating fruit generally.

Where it is desirable to treat only the pulp proper, the separating sieves or screens for the pulp should be arranged in series, one capable of retaining the pits, cores, stems, or hulls and passing the skins and pulp, the next capable of separating the skin and coarser fibers from the finer pulp, and the next for operating on the finer pulp. It is to be understood that the skins and coarser fibrous portions of the fruit can be treated the same as the finer pulp by discharging the separated skins and coarser fiber into a receptacle and drawing the same therefrom into a vacuum pan or kettle to be cooked and concentrated therein under the same conditions as in the treatment of fine pulp. The treatment must be *in vacuo* and under the same conditions as to heat and vacuum as required in the treatment of the fine pulp hereinbefore described.

The product delivered from the vacuum pan or kettle may be dried in a closed room heated by steam-coils and having blowers to assist the circulation of air, or the drying may be proceeded with in any of the ordinary systems of drying, such as hot or cold blasts or blowers, with or without steam, stove, furnace, or other heat. For drying the product is run from the pan or kettle preferably into trays, which may, if desired, be sprinkled on the bottom with corn-starch or any suitable material, or the bottom may have cotton cloth spread thereover, cotton cloth being preferred to corn-starch, and this precaution is taken in order to prevent the fruit product from sticking to the bottom of the trays, and with cotton cloth the trays or molds can be made with an iron or wood frame and bottom of wire-screening, supported on stiff wires or small rods of iron or wood. The ends of the trays may be somewhat higher than the sides, and the trays are placed one over another on a truck, which can be run into the drying-room, and the ends of the trays being the highest an opening is left between the trays on the sides for circulation of the drying medium. It is to be understood, however, that while the drying of the material from the pan or kettle is preferably done in a drying-room it can be dried in any suitable manner so as to form a solidified and coherent body, with the moisture eliminated, so as to be proof against the action of both organized and unorganized ferments in keeping and of sufficient tenacity to support itself to be handled without being easily broken in pieces.

The fruit product after the drying treatment is to be taken from the drying-place and packed in boxes, preferably having an inside slightly larger than the slabs, and in packing the first layer has placed thereover a piece of very thin cloth which will just cover the layer, and the succeeding layers, placed one on another, have over each a piece of thin cloth, so that when packed each layer has cloth above and below it, which will prevent the layers from sticking together and also keep the fruit product clean. This interposed cloth, however, is not necessary with all kinds of fruit, and paper may be used in place of cloth, though cloth is preferred, as cloth is readily removed by pouring hot water thereover when the fruit product is desired to be used. This method of packing with cotton cloth or paper between the layers in a box ready for shipment protects the product from insects and is a safeguard against the product becoming wormy or otherwise spoiled.

The product is self-preserving, so far as regards its keeping qualities, by reason of its production in a state of *vacuo* during the cooking and concentrating process and its being moisture-dried against the action of ferments after leaving the vacuum treatment.

The treatment of fruit under the steps of the process of this invention serves to retain in the finished product the flavors and qualities of fruit in its original state. The product thus produced is adapted for manufacturing purposes generally, and for the use of preservers, confectioners, bakers, and other manufacturers and housekeepers and can be used as a filling for pastry and for any purpose for which cooked fresh fruit in its natural state is used and take the place of fresh fruit. For use as a filling for pastries all that is necessary is to dissolve a sufficient amount of the product for the quantity of filling desired in hot water to the consistency required, and with the fruit treated in its natural state and without sugar or other sweetening the proper amount of sweetening should be added for the filling, and the result will be the same as if cooked fresh fruit had been used, requiring, however, less labor and less cost than the average labor and cost for fresh fruit.

Among some of the advantages which may be mentioned for the process of this invention applied to the preserving of fruits are the following: The fruit is kept from oxidation. It is maintained throughout the process in a healthy natural condition. The cooking and concentrating of the fruit is at a temperature by which but little, and in reality practically none, of the flavor of the fruit is lost, and if treated to an agent to prevent decolorization the color of the fruit will be retained. The result of cooking and concentrating *in vacuo* of the natural fruit-pulp is one by which this pulp can be made thick or thin at the will of the preserver by simply grading the length of time for the treatment *in vacuo*, and the process can also be employed with the addition of sugar, glucose, syrup, or other sweetening agent without materially affecting the condition of the product as regards flavor and the natural properties of the fruit.

An apparatus suitable for the purpose of carrying out the steps of the process is illustrated in the drawings, in which—

Figure 1 is an elevation showing an arrangement of grinder, separator, and vacuum pan or kettle for coöperation one with the other; Fig. 2, an elevation in outline of a drying-room, and Fig. 3 an elevation in outline of a sulfurizing or decolorization room.

The grinder can be of any suitable construction, having a body or frame A and a hopper A' and containing within the body below the mouth of the hopper a cutting-cylinder $a$, with suitable knives and coöperating cutting-fingers $a'$ and pressure-controlling springs $a^2$ for the fingers. The ground or mashed fruit descends through a spout $B^2$, connected with the grinder, into a separator or pulper B, having the upper portion of its shell or body solid and the lower portion of its shell or body formed of wire-netting or perforated sheet metal $b$ and constituting a sieve or sifter, to coöperate with which are brushes $b'$ on a revoluble shaft B', suitably driven. The separated fine pulp passes through the sieve or sifter into a receiving trough or tank C, leading from which is a pipe $c$, having a controlling cock or valve $c'$ terminating within the interior of a vacuum pan or kettle D to discharge the plastic mass or pulp into the interior of the vacuum pan or kettle. The vacuum pan or kettle has a manhole D', shown open in the drawings, and connected with its upper end is a condensing-chamber $D^2$ for the reception of the withdrawn moisture from the mass in the pan or kettle. An agitator operates within the interior of the pan or kettle and is carried by a rotatable shaft $d$, and steam is supplied to the kettle or pan by a valve-controlled pipe $d'$, and an exhaust-pump $d^2$ is provided for withdrawing the condensation. The material is educted from the pan or kettle through a discharge spout or nozzle into trays E, the sides of which are lower than the ends $e$, so as to leave an air-space, and when filled the trays are placed in a suitable place for drying. The trays in the arrangement of apparatus illustrated are placed in a drying-room F, having therein steam-coils $f$ for raising and maintaining the temperature of the room at the proper degree of heat for drying the contents of the trays to the requisite amount. The drying-room is shown in Fig. 2 and is to be located so as to be readily accessible from the pan or kettle for the reception of the filled trays.

The fruit to be treated against decolorization prior to being processed is placed in lug-boxes $g$, and the boxes are placed in a suitable receptacle or room G, where the fruit in the boxes can be treated to the action of chemicals in solution or to the fumes of chemicals of such nature as will have a harmless effect on the fruit and will not affect the health of the consumer and which will furnish a perfect safeguard against decolorization. This can be done either after the fruit is washed and pitted or cored and before entering the grinder, or the treatment against decolorization could be in the process of mashing or after the material leaves the grinder, or it could be in the separator or after it leaves the separator, or in the vacuum pan or kettle, or after the solidified and coherent product leaves the pan or kettle, either as it descends into the receiving-tray or after being deposited in the tray, it being immaterial where the treatment to prevent decolorization is had so long as such treatment is had at a time and place which will retain the natural color of the fruit and prevent oxidation of the fruit or the product, and this treatment to prevent decolorization is especially beneficial with fruits where oxidation changes the color of the fruit, and it is desirable, though not a necessity, in treating any fruit under the process of the invention that at some stage or step in the process as a whole the fruit should be given a treatment to prevent decolorization and oxidation, and thereby retain the color of the fruit and adding to the value of the product in this respect.

It is to be understood that the masher, the separator, the receiving-tank for the pulp to be treated, and the vacuum pan or kettle are to have such relation one to the other that the progress of the fruit from the point of its admission into the grinder or crusher to the point of admission into the pan or kettle and the eduction therefrom in properly-treated condition may be a continuous uninterrupted progress, and, if desired, the grinder can have a close relation to the decolorization-room, and the drying-room can have a close relation to the vacuum pan or kettle, with the end in view of having the entire treatment of the fruit a practically continuous one.

The treatment of berries under the process of this invention does not necessarily require the mashing of the berries in a separate machine, though such practice may be had; but ordinarily the berries can be operated upon in the separator without a preliminary grinding. The berries are reduced to a pulpy condition, the same as described for fruit generally, and the pulp of the berries, with the juice therein, is drawn into the vacuum pan or kettle and there subjected to treatment under a temperature and vacuum conditions to concentrate the material and produce a thick paste, as already described for fruit in general, it being preferred not to use in the pan or kettle sugar, syrup, or other sweetening ingredient. The drying treatment completes the process and produces a resultant berry-fruit product of a nature containing therein the taste, color, and essential properties of the berries from which the product was produced. The treatment of very ripe fruit under the process of the invention can be carried on similar to the treatment of berries, and in the treatment of both the ripe fruit and berries without a preliminary treatment to bring the fruit into a mash ripe fruit, like berries, can be first operated upon in the separator or pulper after being washed, if so desired, and there pulped and the pulp and juice subjected to a treatment *in vacuo* in the pan or kettle. While it is preferred to mash fruit and berries and separate the pulp and juice from the skin and coarser fibers before treatment *in vacuo*, it is evident that ripe fruit and berries can be deposited in the vacuum pan or kettle and the reduction of the mass to a pulp condition and its subsequent concentration into a plastic state can all be done in the pan or kettle. It is preferred to discharge the treated product from the pan or kettle into pans or trays and have the product in the shape of cakes, slabs, or sheets; but instead of this form for the product it could be made into granules, powder, shavings, or shreds by the employment of proper machinery and still retain therein the flavor and other properties of the fruit, and when granulated, powdered, shaved, or shredded the product can be wrapped, if so desired, in cloth, paper, or other protecting material against vermin and atmospheric influences.

The product is solidified and strongly coherent. It is very compact and thoroughly sterilized. It is proof against the action from within of organized and unorganized ferments. It is not sensitive to atmospheric influences, and it will retain its flavor and natural properties for a long period of time and in different climates.

It will be understood that in carrying out the process of my invention the essential and necessary step is the cooking and concentrating or treating the fruit under a vacuum or *in vacuo* at a temperature and under a vacuum, as stated hereinbefore, by which the flavors and the other essential properties of the fruit will be retained in the product. This step has combined therewith preliminary steps—such as washing, treating to prevent decolorization, crushing the fruit, and separating the pulp with the juice therein. The *vacuo* step of the process is followed by drying the resultant of the *vacuo* treatment to render it proof against the action of ferments. It is to be understood that the treatment to prevent decolorization should be used where it is desired to retain the color of the fruit, but can be dispensed with where the retention of the color is not wanted; but the pulping of the fruit and the treatment *in vacuo* of the fruit and the subsequent drying of the resultant from the *vacuo* treatment are necessary and essential in carrying out the process in the making of a fruit product with the flavors and other properties retained therein and which is fermentation-proof and self-protected against moisture and climatic changes.

While it is preferred to carry out the process and treat the fruit without the use of a sweetening, it is to be understood that a sweetening may be added to the fruit either before or during the treatment in the vacuum pan or kettle.

What I regard as new, and desire to secure by Letters Patent, is—

1. The process of preserving fruit, which consists in reducing the fruit to a pulp leaving therein the solids of the juice, and then subjecting the pulp and the solids of the juice to a concentrating cooking treatment *in vacuo*, substantially as described.

2. The process of preserving fruit, which consists in reducing the fruit to a pulped condition with the juice retained therein and then subjecting the pulp and the solids of the juice to a concentrating cooking treatment *in vacuo*, and finally drying the product, substantially as described.

3. The process of preserving fruit which consists in reducing the fruit to a pulped condition with the juice retained therein, then subjecting the pulp and the solids of the juice and an added binder to a concentrating cooking treatment *in vacuo*, and finally drying the product, substantially as described.

4. The process of preserving fruit which consists in first mashing the fruit and reducing the same to a pulped condition with the juice retained therein, separating the finer pulp with the solids of the juice from the coarser material, and then subjecting the separated pulp with the solids of the juice to a concentrating cooking treatment *in vacuo*, substantially as described.

5. The process of preserving fruit which consists in first mashing the fruit and reducing the same to a pulped condition with the juice retained therein, separating the finer pulp with the solids of the juice from the coarser material, then subjecting the separated pulp with the solids of the juice to a concentrating cooking treatment *in vacuo*, and finally drying the product, substantially as described.

6. The process of preserving fruit, which consists in first mashing the fruit and reducing the same to a pulped condition with the juice retained therein, separating the finer pulp with the solids of the juice from the coarser material, then subjecting the separated pulp with the solids of the juice to a concentrating cooking treatment *in vacuo*, compressing the product into homogeneous blocks, and finally drying the blocks, substantially as described.

DANIEL F. SHERMAN.

Witnesses:
OSCAR W. BOND,
THOMAS B. MCGREGOR.